US011054007B2

(12) United States Patent
Shin et al.

(10) Patent No.: US 11,054,007 B2
(45) Date of Patent: Jul. 6, 2021

(54) LEAD SCREW STRUCTURE AND ASSEMBLY AND REAR WHEEL STEERING APPARATUS USING THE SAME

(71) Applicant: MANDO CORPORATION, Pyeongtaek-si (KR)

(72) Inventors: Kyung Sub Shin, Seoul (KR); Han Sang Chae, Seongnam-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 96 days.

(21) Appl. No.: 15/842,732

(22) Filed: Dec. 14, 2017

(65) Prior Publication Data

US 2018/0187758 A1 Jul. 5, 2018

(30) Foreign Application Priority Data

Dec. 29, 2016 (KR) .................. 10-2016-0181951

(51) Int. Cl.
*F16H 25/20* (2006.01)
*B62D 3/06* (2006.01)
(Continued)

(52) U.S. Cl.
CPC .......... *F16H 25/2006* (2013.01); *B62D 3/06* (2013.01); *B62D 5/0403* (2013.01);
(Continued)

(58) Field of Classification Search
CPC ..... F16H 2025/2081; F16H 2025/2096; F16H 2025/2445; F16H 25/2006; F16H 25/2015;
(Continued)

(56) References Cited

U.S. PATENT DOCUMENTS 6,041,671 A * 3/2000 Erikson ............... F16H 25/2006
411/231
6,142,032 A * 11/2000 Creager ............. F16H 25/2006
74/441
(Continued)

FOREIGN PATENT DOCUMENTS

CN 102628499 A 8/2012
JP H03-272358 A 12/1991
(Continued)

OTHER PUBLICATIONS

Korean Office Action dated Jan. 12, 2018 issued in Korean Patent Application No. 10-2016-0181951.
(Continued)

*Primary Examiner* — Joseph Brown
(74) *Attorney, Agent, or Firm* — Morgan, Lewis & Bockius LLP

(57) ABSTRACT

A lead screw structure comprises a screw shaft having a thread on an outer circumferential surface thereof, a nut unit coupled to the screw shaft such that and a thread formed on an inner circumferential surface of the nut unit is engaged with the thread of the screw shaft, and a first elastic member disposed on a portion of the nut portion, in a direction of the screw shaft, to provide an elastic force to the nut portion in the screw shaft, thereby compensating for a gap between the thread of the outer circumferential surface of the screw shaft and the thread of the inner circumferential surface of the nut unit.

11 Claims, 4 Drawing Sheets

(51) Int. Cl.
  *B62D 5/04* (2006.01)
  *B62D 7/15* (2006.01)
(52) U.S. Cl.
  CPC ......... *B62D 5/0421* (2013.01); *B62D 5/0424* (2013.01); *B62D 5/0445* (2013.01); *B62D 7/1581* (2013.01); *F16H 25/2015* (2013.01)
(58) Field of Classification Search
  CPC ...... B62D 3/06; B62D 5/0403; B62D 5/0421; B62D 5/0424; B62D 5/0445; B62D 7/1581
  USPC ....................................................... 74/89.42
  See application file for complete search history.

(56) References Cited

U.S. PATENT DOCUMENTS

| | | | | |
|---|---|---|---|---|
| 7,841,251 B2* | 11/2010 | Bogue | ..................... | F16B 37/00 74/89.42 |
| 7,891,265 B2* | 2/2011 | Erikson | ............... | F16H 25/2006 310/75 D |
| 8,789,648 B2* | 7/2014 | Lee | ..................... | B62D 5/0427 180/444 |
| 9,476,489 B2* | 10/2016 | Funada | ............... | F16H 25/2204 |
| 9,964,201 B2* | 5/2018 | Lin | ..................... | F16H 57/0497 |
| 2005/0258823 A1* | 11/2005 | Kinoshita | ................ | F01L 1/34 324/207.23 |
| 2007/0129192 A1* | 6/2007 | Song | .................... | B62D 5/0424 474/148 |
| 2012/0192662 A1* | 8/2012 | Kluge | ................. | B62D 5/0448 74/89.17 |
| 2014/0345966 A1* | 11/2014 | Asakura | ............... | B62D 5/0445 180/444 |
| 2014/0353068 A1* | 12/2014 | Yamamoto | ........... | B62D 5/0412 180/444 |
| 2016/0305517 A1* | 10/2016 | Beyerlein | ........... | F16H 25/2209 |

FOREIGN PATENT DOCUMENTS

| | | |
|---|---|---|
| JP | 2003-322233 A | 11/2003 |
| KR | 10-2004-0068650 A | 8/2004 |
| KR | 10-2013-0138006 A | 12/2013 |
| KR | 10-2014-0044662 A | 4/2014 |
| KR | 10-2014-0082303 A | 7/2014 |
| KR | 10-2016-0053207 A | 5/2016 |

OTHER PUBLICATIONS

Office Action issued in Chinese Patent Application No. 201711472663.3 dated Apr. 2, 2021.

* cited by examiner

LEAD SCREW STRUCTURE AND ASSEMBLY AND REAR WHEEL STEERING APPARATUS USING THE SAME

CROSS-REFERENCE TO RELATED APPLICATION

This application claims priority to and the benefit of Korean Patent Application No. 10-2016-0181951, filed on Dec. 29, 2016, the disclosure of which is incorporated herein by reference in its entirety.

BACKGROUND

1. Field of the Disclosure

The present disclosure relates to a lead screw structure and assembly and a rear wheel steering apparatus using the same.

2. Discussion of Related Art

Conventionally, a vehicle is provided with an electric steering apparatus for assisting steering force. The electric steering apparatus assists the steering force using the power of a motor. The electric steering apparatus is installed in the width direction of the vehicle and is connected to the wheels.

A lead screw structure may be applied to convert the rotational force of the motor to a linear driving force, the lead screw structure including a male screw shaft directly engaged with a female screw nut member. Generally, in the lead screw structure, when the screw shaft is connected to the motor and the nut member is connected to the output shaft, the screw shaft is rotated using the motor, allowing the nut member to move in the screw shaft direction and the output shaft to moves linearly. Alternatively, when the nut member is connected to the motor and the screw shaft is connected to the output shaft, the screw shaft and the output shaft are moved linearly by rotating the nut member using the motor.

The electric steering apparatus having the above driving principle includes a housing, a screw shaft provided in the housing, a nut member into which the screw shaft is inserted, and a driving portion for rotating the nut member. When the driving portion rotates the nut member, the screw shaft is moved along the axial direction, thereby adjusting the angle of the wheel.

Since the screw shaft and the nut member are driven, with respective thread surfaces thereof being mechanically engaged with each other, the thread surfaces may be easily abraded. When a gap is formed between the coupling faces due to the abrasion of the thread surfaces, noise may be generated and driving force may not be properly transmitted.

SUMMARY OF THE DISCLOSURE

An object of the present disclosure is to provide a lead screw structure and assembly and a rear wheel steering apparatus using the same capable of compensating for a gap between coupling faces caused by thread surface abrasion of a screw shaft and a nut member.

According to an aspect of the present disclosure, provided is a lead screw structure including a screw shaft having a thread on an outer circumferential surface thereof, a nut unit coupled to the screw shaft such that and a thread formed on an inner circumferential surface of the nut unit is engaged with the thread of the screw shaft, and a first elastic member disposed on a portion of the nut portion, in a direction of the screw shaft, to provide an elastic force to the nut portion in the screw shaft, thereby compensating for a gap between the thread of the outer circumferential surface of the screw shaft and the thread of the inner circumferential surface of the nut unit.

Here, the nut unit may include a first nut member and a second nut member, the first elastic member may be disposed between the first nut member and the second nut member.

Here, the first nut member may have a first inner circumferential surface to which the screw shaft is coupled and a second inner circumferential surface having a plurality of grooves arranged in a circumferential direction, a diameter of the second inner circumferential surface being greater than a diameter of the first inner circumferential surface, the second nut member may have a plurality of teeth arranged on a portion of an outer circumferential surface thereof, in the longitudinal direction of the screw shaft, the plurality of teeth corresponding to the plurality of the grooves, and the first nut member and the second nut member may be coupled, with the plurality of the teeth being inserted into the plurality of the grooves in the direction of the screw shaft.

Here, the first nut member may have a first inner circumferential surface to which the screw shaft is coupled and a second inner circumferential surface having a serration formed in the direction of the screw shaft, a diameter of the second inner circumferential surface being greater than a diameter of the first inner circumferential surface, and the second nut member may have a serration formed on a side of an outer circumferential surface, in the direction of the screw shaft, the serration of the second nut member corresponding to the serration of the first nut member, the first nut member and the second nut member being coupled to each other using the serrations thereof.

Here, the first elastic member may be disposed on one end of the first nut member in the direction of the screw shaft to provide an axial force in the direction of the screw shaft.

Here, the first elastic member may be a wave washer.

According to another aspect of the present disclosure, provided to a lead screw assembly including a housing, the lead screw provided in the housing, and a second elastic member having one end disposed on a predetermined portion of the nut unit, in the direction of the screw shaft, and the other end supported on the housing to provide an elastic force to the nut unit in the direction of the screw shaft.

Here, the assembly may further include a first bearing coupled to a predetermined portion of the first nut member to support rotation of the nut unit, and a second bearing coupled to a predetermined portion of the second nut member to support rotation of the nut unit, the second elastic member is disposed between the second bearing and the housing.

Here, the assembly may further include a gear member coupled to an outer circumferential surface of the nut unit and transmitting a rotational force to the nut unit.

Here, the assembly may further include a tolerance ring disposed between an outer circumferential surface of the nut unit and an inner circumferential surface of the gear member, the nut unit and the gear member are integrally rotated.

According to another aspect of the present disclosure, provided to a rear wheel steering apparatus including the lead screw assembly, and a driving unit connected to the gear member to supply rotational force to the nut unit.

Here, the driving portion may include a motor connected to the gear member, and the apparatus may further include a sensor disposed on the housing to measure an axial displacement of the screw shaft by measuring a number of revolutions in accordance with rotation of the nut unit.

A lead screw structure and assembly and a rear wheel steering apparatus using the same according to exemplary embodiments of the present disclosure may include an elastic member, for example, a wave washer, providing an axial force in the longitudinal direction of a screw shaft, thereby making it possible to compensate a gap caused by the abrasion of the thread surfaces of the screw shaft and the nut members.

DETAILED DESCRIPTION OF EXEMPLARY EMBODIMENTS

Figure 1:
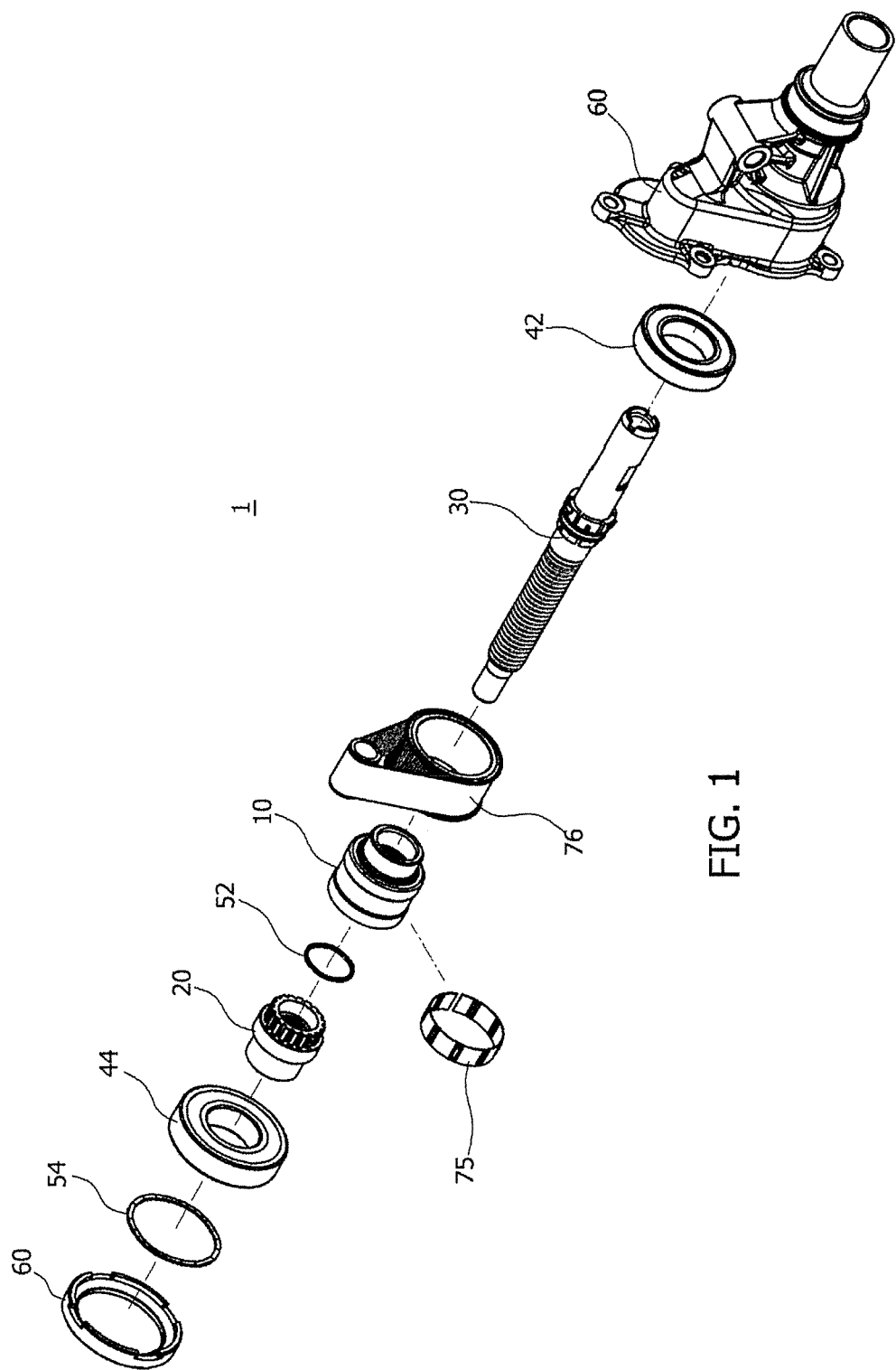
FIG. 1 is an exploded perspective view illustrating a lead screw structure and assembly according to an embodiment of the present disclosure.

Hereinafter, embodiments of the present disclosure will be described in detail with reference to the accompanying drawings so that a person having ordinary skills in the art to which the disclosure pertains can easily carry out the present disclosure. The present disclosure may be embodied in many different forms and is not limited to the embodiments described herein. In the drawings, parts not relating to the description may be omitted for clarifying the present disclosure, and the same reference numerals may be assigned to the same or similar components throughout the specification.

In this specification, the terms, such as "comprise" or "have," as well as variations thereof, refer to the presence of stated features, numbers, steps, operations, elements, parts or combinations thereof, but do not preclude the presence or addition of one or more other features, numbers, steps, operations, components, parts or combinations thereof. In addition, it will be understood that when an element, such as a layer, a film, an area, a plate or the like, is referred to as being "on" another element, not only can it be "directly on" another element, but it can also be on another element via an "intervening" element. In the same context, when an element, such as a layer, a film, an area, a plate or the like, is referred to as being "under" another element, not only can it be "directly under" another element, but it can also be indirectly under another element via an "intervening" element.

Figure 2:
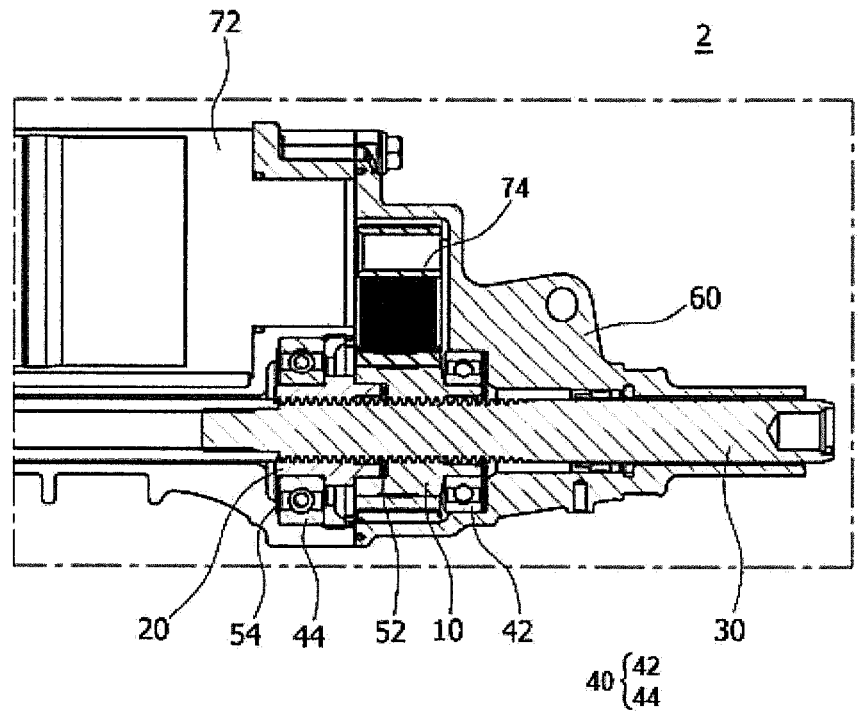
FIG. 2 is a cross-sectional view illustrating the lead screw structure and assembly according to an embodiment of the present disclosure.
Figure 3:
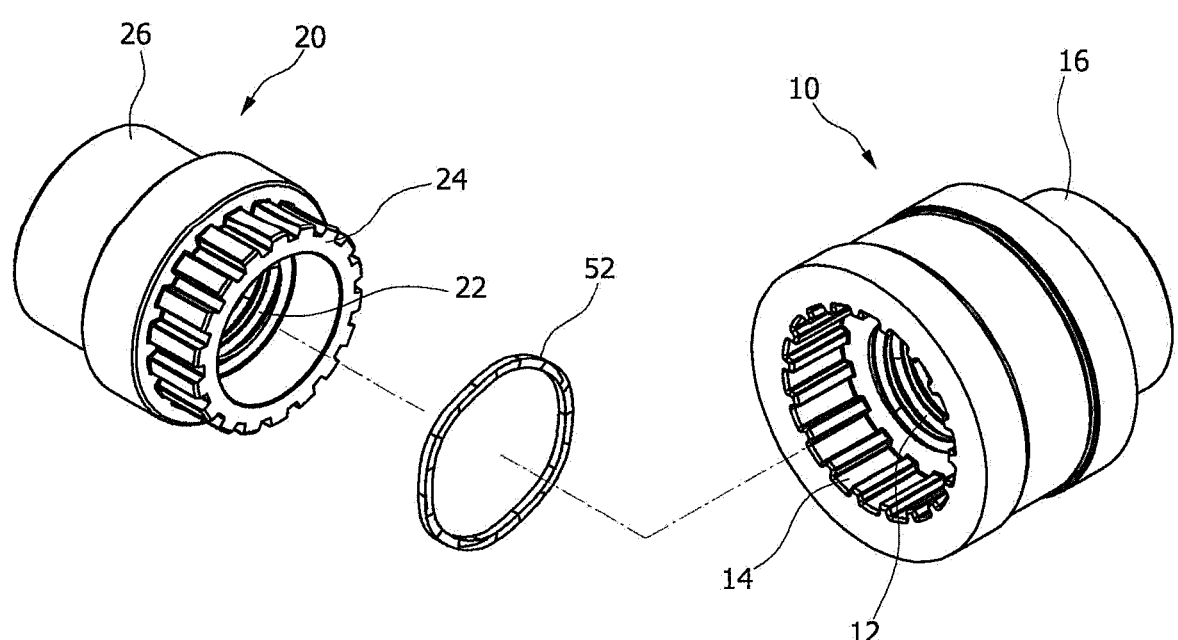
FIG. 3 is an exploded perspective view illustrating the assembly of the nut unit of the lead screw structure according to an embodiment of the present disclosure.
Figure 4:
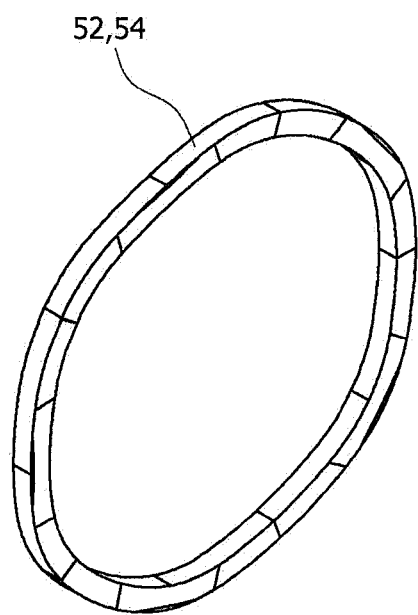
FIG. 4 is a perspective view illustrating the elastic member of the lead screw structure and assembly according to an embodiment of the present disclosure.
Figure 5:
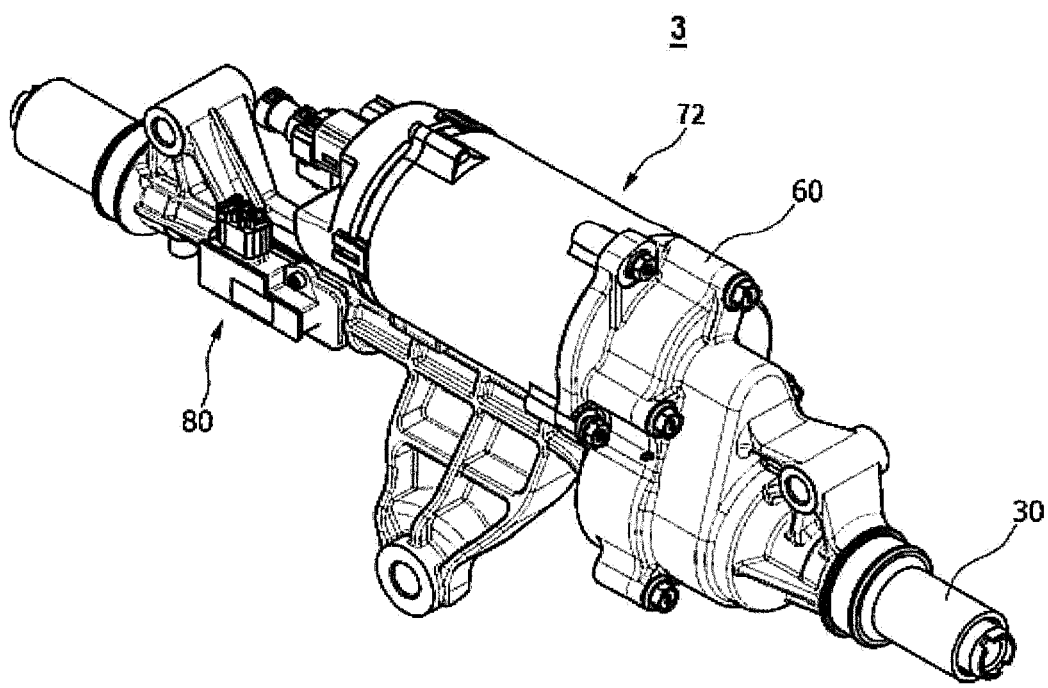
FIG. 5 is a perspective view illustrating a rear wheel steering apparatus using the lead screw structure according to an embodiment of the present disclosure.

FIG. 1 is an exploded perspective view illustrating a lead screw structure and assembly according to an embodiment of the present disclosure. FIG. 2 is a cross-sectional view illustrating the lead screw structure and assembly according to an embodiment of the present disclosure. FIG. 3 is an exploded perspective view illustrating the assembly of the nut unit of the lead screw structure according to an embodiment of the present disclosure. FIG. 4 is a perspective view illustrating the elastic member of the lead screw structure and assembly according to an embodiment of the present disclosure. FIG. 5 is a perspective view illustrating a rear wheel steering apparatus using the lead screw structure according to an embodiment of the present disclosure.

A rear wheel steering apparatus 3 according to an embodiment of the present disclosure is an apparatus for assisting the steering force of rear wheels of a vehicle, and may include a lead screw assembly 2 for converting rotational force of a motor 72 into axial force of the wheel.

The lead screw assembly 2 includes a lead screw structure 1 including a nut and a screw shaft and a gear member 74 transmitting rotational force to the nut and a bearing coupled to the screw shaft. The lead screw assembly 2 may be provided within a housing.

The lead screw structure 1 is configured to convert rotational force into linear driving force. In the lead screw structure 1, the screw shaft moves in the axial direction as the nut coupled to the screw shaft rotates, or the nut is coupled on the screw shaft to be linearly moved in the axial direction by rotation of the screw shaft.

Hereinafter, the lead screw structure 1 according to an embodiment of the present disclosure will be described, and the lead screw assembly 2 will be described, focusing on further constitutional components in addition to the lead screw assembly 1. Finally, the rear wheel steering apparatus 3 using the lead screw assembly 2 will be described.

The lead screw structure 1 according to an embodiment of the present disclosure may include a screw shaft 30, a nut unit 10 and 20, and a first elastic member 52.

The screw shaft 30 is in the shape of a bar, and may have a spiral thread (or threads) formed on an outer circumferential surface thereof. Here, an inter-thread distance is referred to as a pitch. The larger the pitch is, the greater the linear displacement of the screw shaft 30 due to the rotation of the nut unit 10 and 20 may be. The length of the pitch may be determined differently depending on the specific product using the lead screw structure 1.

In an embodiment of the present disclosure, a nut unit 10 and 20 may be coupled to the screw shaft 30. Referring to FIG. 3, the nut unit 10 and 20 may include a first nut member 10 and a second nut member 20. Each of the first nut member 10 and the second nut member 20 may be in the shape of a cylinder, with an inner circumferential surface into which a screw shaft 30 is inserted.

The first nut member 10 may have an opening extending in a longitudinal direction, into which the screw shaft 30 is inserted. A first press-fitting portion 16 for being coupled to a first bearing 42 may be formed on a side of the first nut member 10. The first press-fitting portion 16 may protrude in the shape of a cylinder having a diameter smaller than the diameter of the cylindrical shape of the body of the first nut member 10, and may have an opening extending in a longitudinal direction, into which the screw shaft 30 is inserted. The first press-fitting portion may be press-fitted into the first bearing 42 to couple the first bearing 42 and the first nut member 10.

An opening for coupling with the second nut member 20 may be formed in the other side of the first nut member 10. The diameter of this opening may be larger than the diameter of the opening into which the screw shaft 30 is inserted. A first inner circumferential surface 12 to which the screw shaft 30 is coupled and a second inner circumferential surface 14 to which the second nut member 20 is coupled may be formed on the inner circumference of the first nut member 10. The second inner circumferential surface 14 is stepped from the first inner circumferential surface 12.

A thread may be formed on the first inner circumferential surface 12 to which the screw shaft 30 is coupled such that the thread fits and is in surface contact with the tooth of the screw shaft 30. A serration, i.e. a set of teeth, may be formed on the second inner circumferential surface 14 to which the second nut member 20 to be serration engaged with a protrusion 24 of the second nut member 20, which will be described later.

The second nut member 20 of the lead screw structure 1 according to an embodiment of the present disclosure may be in the shape of a cylinder, and may have an opening extending in a longitudinal direction, into which the screw shaft 30 is inserted. A third inner circumferential surface 22 of the second nut member 20, to which the screw shaft 30 is coupled, has a diameter corresponding to the first inner circumferential surface 12 of the first nut member 10. A tooth for engagement with the screw shaft 30 may be formed on the third inner circumferential surface 22.

In addition, the second nut member 20 may have the protrusion 24 formed on the front side and a second press-fitting portion 26 formed on the rear side. The protrusion 24 protruding forwardly from the second nut member 20 may be serration-engaged with the above-described first nut member 10.

Particularly, the diameter of the outer circumferential surface of the protrusion 24 and the diameter of the second inner circumferential surface 14 of the first nut member 10 are formed to correspond to each other. A serration corresponding to the serration formed on the second inner circumferential surface 14 of the first nut member 10 may be formed on the outer circumferential surface of the protrusion 24.

The second press-fitting portion 26 may protrude backwardly from the second nut member 20, be press-fitted into the second bearing 44, and couple the second nut member 20 and the second bearing 44.

According to an embodiment of the present disclosure, the first nut member 10 and the second nut member 20 may be serration-engaged with each other. As described above, the first nut member 10 and the second nut member 20 may be engaged with each other using the serrations formed on the second inner circumferential surface 14 of the first nut member 10 and on the outer circumferential surface of the protrusion 24 of the second nut member 20.

The serrations may extend in the direction of the screw shaft 30 so that the first nut member 10 and the second nut member 20 are engaged with each other in the axial direction.

Such serration engagement may be performed such that the first nut member 10 and the second nut member 20 can rotate simultaneously. However, the first nut member 10 and the second nut member 20 may move in the axial direction of the screw shaft 30. As will be described later, the first nut member 10 and the second nut member 20 may be axially movable to provide an axial displacement when a gap is formed between coupling faces in the lead screw structure 1.

According to an embodiment of the present disclosure, the first nut member 10 and the second nut member 20 may integrally rotate about the screw shaft 30, in which the first nut member 10 and the second nut member 20 may be coupled to each other to be linearly movable in the axial direction of the screw shaft. The linear movability is to compensate for the gap caused by the fastening of the screw shaft and the nut.

Specifically, the first nut member 10 may include a first inner circumferential surface 12 to which the screw shaft 30 is coupled and a second inner circumferential surface 14 having a plurality of grooves arranged in the circumferential direction. The diameter of the first inner circumferential surface 12 may be smaller than the diameter of the second inner circumferential surface 14.

Referring to FIG. 3, a plurality of teeth (e.g. a serration) may be formed on a portion (e.g. the protrusion 24) of the outer circumferential surface of the second nut member 20, in the longitudinal direction of the screw shaft. The part of the screw shaft direction may include an end of the second nut member 20. In addition, the plurality of the teeth of the second nut member 20 may be formed to correspond to the plurality of grooves of the first nut member 10.

Therefore, as illustrated in FIG. 3, the plurality of teeth formed on the outer circumferential surface of one end portion (e.g. the protrusion 24) of the second nut member 20 are inserted into the plurality of grooves formed on the second inner circumferential surface 14 of the first nut member 10, thereby allowing the first nut member 10 and the second nut member 20 to integrally rotate about the axis while being coupled to be linearly movable in the axial direction.

Referring to FIGS. 3 and 4, the first elastic member 52 may be disposed between the first nut member 10 and the second nut member 20. The first elastic member 52 may be a wave washer, as illustrated in FIG. 4. However, the first elastic member 52 is not limited to the wave washer but may be embodied in other forms, such as a linear spring.

The wave washer may be formed by bending both sides of a typical ring-shaped washer. Accordingly, when the elastic member is pressed in the axial direction in which the elastic member is inserted, the elastic force may be preserved according to the compression height of the elastic member.

The first elastic member 52 may be formed to have a size corresponding to the tip diameter of the protrusion 24 having the serration. Referring to FIG. 3, the first elastic member 52 may be coupled to the second nut member 20, with the inner circumferential surface of first elastic member 52 being in contact with the serration formed on the protrusion 24 of the second nut member 20. One side of the first elastic member 52 is in contact with the outer circumferential portion of the first nut member 10, while the other side of the first elastic member 52 is in contact with the surface of the second nut member 20 on which the protrusion 24 is formed.

Therefore, the serration-engaged first nut member 10 and the second nut member 20 are movable in the axial direction by a predetermined displacement when the nut unit, with the first elastic member 52 coupled thereto, is pressed in the axial direction. Therefore, when a gap is formed between the engaging faces, due to the abrasion of the nut unit 10 and 20 and the screw shaft 30, the gap may be compensated for by the elastic restoring force of the compressed first elastic member 52

According to an embodiment of the present disclosure, the nut unit 10 and 20 and the screw shaft 30 are fitted with each other to be in surface contact, the thread surfaces of the surface-contacted nut unit 10 and 20 and the screw shaft 30 may be abraded due to the rotation of the nut unit 10 and 20 and the screw shaft 30.

When a gap is formed between the engaging faces by the abrasion, the first elastic member 52 according to an embodiment of the present disclosure can press the first nut member 10 and the second nut member 20 in the axial direction to provide an axial displacement for compensating for the gap to the first nut member 10 and the second nut member 20.

Hereinafter, the lead screw assembly 2 using the lead screw structure 1 according to the above-described embodiment will be described in detail. The lead screw assembly 2 according to the embodiment of the present disclosure further includes a housing 60, bearings 40, a gear member 74 and a second elastic member 54, as well as the lead screw assembly. A description will be mainly given of the constitutional components added to the lead screw structure 1.

The housing 60 may protect internal members from external impact and may block driving noise. The housing 60 may include a housing body 62 and a housing cover 64.

Referring to FIG. 2 illustrating the interior of the housing 60, the second elastic member 54, the second bearing 44, the nut unit 10 and 20, and the first bearing 42 may be disposed sequentially from the rear to the front of the screw shaft 30. In addition, a gear provided on the rotation axis of the motor 72 for transmitting the rotational force to the nut unit 10 and 20 may be located within the housing 60.

The lead screw assembly 2 according to an embodiment of the present disclosure may include the bearings 40, which may be comprised of a first bearing 42 and a second bearing 44. The first bearing 42 may be disposed on the front side of the first nut member 10, such that the first press-fitting portion 16 of the first nut member may be press-fitted into and coupled to the first bearing 42. The second bearing 44 is disposed on the rear side of the second nut member 20. The second nut member 20 and the second bearing 44 may be coupled, with the second press-fitting portion 26 of the second nut member 20 being press-fitted into the second bearing 44.

Referring to FIG. 2, the bearings 40 according to an embodiment of the present disclosure may be ball bearings having balls between the inner ring and the outer ring. The screw shaft 30 and the inner rings of the bearings 40 may rotate together. Here, the balls disposed between the inner rings and the outer rings of the bearing 40 can rotate. The bearings 40 can allow rolling friction during rotation of rotary elements, thereby reducing friction. Although the bearings 40 are illustrated as being ball bearings in the drawing, the present disclosure is not limited thereto but roller bearings or the like are also applicable.

According to an embodiment of the present disclosure, the second elastic member 54 may be disposed on the rear side of the screw shaft 30. Unlike the first elastic member 52 coupled to the protrusion 24 of the second nut member 20 and disposed between the first nut member 10 and the second nut member 20, the second elastic member 54 may be coupled to the screw shaft 30 such that a rear side surface thereof is supported by the housing cover 64 and a front side surface thereof is in contact with the first bearing 42. The second elastic member 54 may be a wave washer, as illustrated in FIG. 4. However, the second elastic member 54 is not limited to the wave washer but may be embodied in other forms, such as a linear spring or the like.

While the first elastic member 52 provides the first nut member 10 and the second nut member 20 with an axial force in the axial direction of the screw shaft 30, the second elastic member 54 may be supported by the housing cover 64 and may provide axial force to the entirety of the lead screw structure 1.

The lead screw assembly 2 according to an embodiment of the present disclosure may further include the gear member 74. The gear member 74 can transmit rotational force to the nut unit 10 and 20. The rotational force resulting from the driving of the motor 72 may cause the gear member 74 to rotate, the nut unit 10 and 20 may be rotated according to the rotation of the gear member 74, and the screw shaft 30 coupled to the rotating nut unit 10 and 20 may be linearly moved.

Referring to FIG. 4, the gear member 74 is coupled with the outer circumferential surface of the nut unit 10 and 20 so that the gear member 74 and the nut unit 10 and 20 may rotate together. The gear member 74 may be a pulley gear pulley-connected to a gear provided on the rotating shaft of the motor 72.

The nut unit 10 and 20 may slip during the rotation of the gear member 74. To prevent this, the gear member 74 and the nut unit 10 and 20 may be coupled using a tolerance ring 75. Particularly, the tolerance ring 75 may be embodied a C-ring. The tolerance ring 75 may be firmly coupled to the nut unit 10 and 20 when the size of the tolerance ring 75 is formed to be smaller than the diameter of the nut unit 10 and 20. In addition, the outer circumferential surface of the tolerance ring 75 may be provided with wave-like corrugations, such that circumferential surface of the tolerance ring 75 can be firmly coupled to the inner circumferential surface of the gear member 74.

The number of the corrugations formed on the outer circumferential surface of the tolerance ring 75 may be determined differently, depending on the tolerance of products.

The lead screw assembly 2 according to an embodiment of the present disclosure may be applied to various products that convert rotation to linear motion. Not only the case in which the rotational force of the motor transmitted to the nut unit 10 and 20 and the screw shaft 30 fitted to the rotating nut unit 10 and 20 is linearly moved by the rotating nut unit 10 and 20, but also the case in which the rotational force of the motor 72 is transmitted to the screw shaft 30 and the nut unit 10 and 20 is linearly moved by the rotating screw shaft 30 which, should be embraced within the scope of the present disclosure.

The bearings 40 are provided on both ends of the screw shaft 30 to allow the screw shaft 30 to move linearly while being rotated by the rotation of the nut unit 10 and 20 and, as well as to reduce friction during the rotation of the screw shaft 30. When a gap is formed between engaging faces due to the abrasion of the thread surface of the screw shaft 30 and the thread surfaces of the nut unit 10 and 20, the first elastic member 52 may provide an axial displacement to the first nut member 10 and the second nut member 20 by providing an axial force thereto.

In addition, the second elastic member 54 may provide an additional axial displacement by pressing the entirety of the lead screw structure 1. Therefore, even in the case in which the gap is formed, the engagement of the thread surfaces of the screw shaft 30 and the nut unit 10 and 20 can be maintained and power can be transmitted. In addition, unnecessary friction and noise can be reduced.

When the lead screw assembly 2 according to an embodiment of the present disclosure is disposed within the housing 60, the elastic member may be disposed in a compressed state such that the elastic member can provide axial force. When the members are disposed within the housing 60 to be compressible in the longitudinal direction of the screw shaft 30, the elastic restoring force according to the shape of the elastic member can be preserved to provide effective compensation for the formation of a gap.

The lead screw assembly 2 according to the embodiment of the present disclosure can be used in an automotive rear wheel steering apparatus 3.

Referring to FIG. 5, the vehicle rear wheel steering apparatus 3 may further include the motor 72 for applying a rotational force to the lead screw assembly and a position sensor 80 for sensing the position of the screw shaft 30, in addition to the above-mentioned lead screw assembly 2.

A rotation shaft of the motor 72 and the gear provided on the rotation shaft may be located within the housing 60. In addition, the screw shaft 30 may be provided within the housing 60 extending in the direction of the screw shaft 30, and the position sensor 80 for sensing the position of the screw shaft 30 may be disposed on an outer surface of the rear side of the housing 60.

According to an embodiment of the present disclosure, the rear wheel steering apparatus 3 can convert the rotation of the motor 72 into the linear motion of the screw shaft 30 and transmit the motion to wheels as axial force. In addition, since the lead screw assembly 2 as described above is applied, when a gap is formed due to the abrasion of the thread surfaces of the screw shaft 30 and the nut unit 10 and 20, the gap may be compensated for when the spacing depending on.

Therefore, it is possible to prevent or reduce noise and vibration and to maintain the steering function of the rear wheels of the vehicle in spite of occurrence of a gap due to abrasion.

Figure 6:
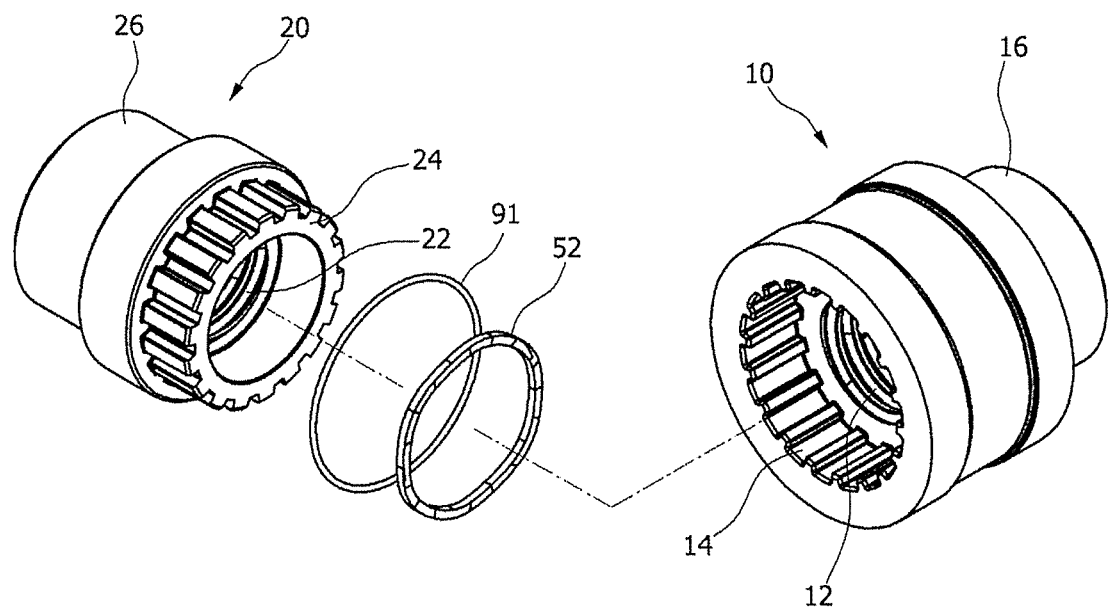
FIG. 6 is an exploded perspective view illustrating a lead screw structure according to another embodiment, modified from the embodiment of FIG. 3.

FIG. 6 is a perspective view illustrating the lead screw structure according to another embodiment, modified from the embodiment of FIG. 3.

Referring to FIG. 6, the lead screw structure 1 may further include a coupling 91.

The coupling 91 may be located between the first nut member 10 and the second nut member 20. The coupling 91 may be configured to surround the serration on the second inner circumferential surface 14 when the first nut member 10 and the second nut member 20 are coupled. The coupling 91 may be in contact with the serration on the second inner circumferential surface 14 and a corresponding serration of the protrusion 24 of the second nut member 20 when the first nut member 10 and the second nut member 20 are coupled. For example, the coupling 91 may be made of an elastic material. For example, the coupling 91 may be provided in the form of an O-ring made of a rubber material.

In another embodiment of the present disclosure, the coupling 91 is provided to prevent a gap or noise and vibration due to abrasion after the engagement between the serration and the corresponding serration. In addition, the coupling 91 can protect the outer circumferential surface of the serration to reduce noise and vibration while absorbing external impacts.

In an embodiment of the present disclosure, the lead screw structure and assembly and the rear wheel steering apparatus using the same according to an exemplary embodiment of the present disclosure may include the elastic member, for example, a wave washer, providing an axial force in the longitudinal direction of the screw shaft, thereby making it possible to compensate a gap caused by the abrasion of the thread surfaces of the screw shaft and the nut member.

Although the foregoing embodiments of the present disclosure have been described above, the spirit of the present disclosure is not limited to the embodiments set forth herein. A person having ordinary skills in the art who understands the spirit of the present disclosure may readily suggest other embodiments by adding, changing, deleting, or the like to components within the scope of the same concept, and all such changes are included within the spirit of the present disclosure.

What is claimed is:

1. A lead screw structure comprising:
a screw shaft having a thread on an outer circumferential surface thereof;
a nut unit coupled to the screw shaft such that a thread formed on an inner circumferential surface of the nut unit is directly engaged with the thread of the screw shaft, the nut unit including a first nut member and a second nut member; and
a first elastic member disposed between the first nut member and the second nut member to provide an elastic force to the nut unit in an axial direction of the screw shaft, thereby compensating for a gap between the thread of the outer circumferential surface of the screw shaft and the thread of the inner circumferential surface of the nut unit that is directly engaged with the thread of the screw shaft,
wherein the first elastic member is a wave washer having a ring shape with bent sides,
the second nut member includes a portion extending into an opening of the first nut member,
the first nut member has a first inner circumferential surface to which the screw shaft is coupled and a second inner circumferential surface having a first serration formed in a longitudinal direction of the screw shaft, a diameter of the second inner circumferential surface being greater than a diameter of the first inner circumferential surface,
the second nut member has a second serration disposed on an outer circumferential surface of the portion extending into the opening of the first nut member, in the longitudinal direction of the screw shaft, the second serration corresponding to the first serration, the first nut member and the second nut member being coupled to each other using the first and second serrations,
the first elastic member is disposed between the first nut member and an end surface of the portion, on which the second serration is disposed, of the second nut member, and
the end surface of the portion, on which the second serration is disposed, of the second nut member, is an innermost portion of the entire second nut member, with respect to the opening of the first nut number in the axial direction of the screw shaft.

2. The structure of claim 1, wherein the first elastic member is disposed on one end of the first nut member in a direction of the screw shaft to provide an axial force in the direction of the screw shaft.

3. The structure of claim 1, further comprising a coupling surrounding the serration on the outer circumferential surface of the second nut when the first nut member and the second nut member are coupled.

4. A lead screw assembly comprising:
a housing;
the lead screw structure according to claim 1 provided in the housing; and
a second elastic member having one end disposed on a portion of the nut unit, in the axial direction of the screw shaft, and another end supported on the housing to provide an elastic force to the nut unit in the axial direction of the screw shaft.

5. The assembly of claim 4, further comprising:
a first bearing coupled to a portion of the first nut member to support rotation of the nut unit; and
a second bearing coupled to a portion of the second nut member to support rotation of the nut unit, wherein the second elastic member is disposed between the second bearing and the housing.

6. The assembly of claim 4, further comprising a gear member coupled to an outer circumferential surface of the nut unit and transmitting a rotational force to the nut unit.

7. The assembly of claim 6, further comprising a tolerance ring disposed between an outer circumferential surface of the nut unit and an inner circumferential surface of the gear member,
wherein the nut unit and the gear member are integrally rotated.

8. A rear wheel steering apparatus comprising:
the lead screw assembly according to claim 6; and
a driving unit connected to the gear member to supply rotational force to the nut unit.

9. The apparatus of claim 8, wherein the driving unit comprises a motor connected to the gear member; and the apparatus further comprising a sensor disposed on the housing to measure an axial displacement of the screw shaft by measuring a number of revolutions in accordance with rotation of the nut unit.

10. The structure of claim 1, wherein the first elastic member is disposed between the innermost surface of the second nut member and a first surface of the first nut member facing the innermost surface in the axial direction of the screw shaft, and the first elastic member is disposed without the second nut member being arranged between the first elastic member and the screw shaft in a radial direction of the screw shaft.

11. The structure of claim 1, wherein threads formed on inner circumferential surfaces of each of the first and second nut members is in direct contact with the thread on the outer circumferential surface of the screw shaft.

* * * * *